United States Patent [19]
Williams

[11] Patent Number: 5,283,968
[45] Date of Patent: Feb. 8, 1994

[54] EDGELIT LUMINAIRES

[75] Inventor: Christopher Williams, Stoke-on-Trent, United Kingdom

[73] Assignee: JSB Electrical Plc, Crewe, United Kingdom

[21] Appl. No.: 841,494

[22] Filed: Feb. 26, 1992

[51] Int. Cl.$^5$ ............................................. G09F 13/18
[52] U.S. Cl. ............................................. 40/546; 40/582
[58] Field of Search ................. 40/546, 542, 543, 572, 40/582, 546

[56] References Cited

U.S. PATENT DOCUMENTS

| | | | |
|---|---|---|---|
| 2,994,149 | 3/1961 | Endelson | 40/546 |
| 3,486,261 | 12/1969 | Hardesty | 40/546 |
| 3,510,976 | 5/1970 | Pauline et al. | 40/542 X |
| 3,591,941 | 7/1971 | Jaffe, Jr. | 40/546 |
| 4,244,130 | 1/1981 | Frois . | |
| 4,373,282 | 2/1983 | Wragg . | |
| 4,715,137 | 12/1987 | Scheve | 40/546 |
| 4,791,745 | 12/1988 | Pohn | 40/543 X |

FOREIGN PATENT DOCUMENTS

| | | | |
|---|---|---|---|
| 3706392 | 9/1988 | Fed. Rep. of Germany | 40/582 |
| 2168519 | 1/1986 | United Kingdom . | |
| 2164138 | 6/1986 | United Kingdom . | |

*Primary Examiner*—James R. Britain
*Assistant Examiner*—C. Hope Davis
*Attorney, Agent, or Firm*—Dennison, Meserole, Pollack & Scheiner

[57] ABSTRACT

An edgelit luminaire 10 and a display panel 26 for same in which light generated by a light source 30 is evenly distributed throughout the panel. The panel is formed of a sheet 27 of transparent or semi-transparent plastics, one side of which bears a sign, notice or graphic symbol 32. The sign 32 has sections of different opacity. A plurality of uniformly sized and uniformly spaced dots 34 are overprinted over the sign 32 and the panel 26 to form a half-tone of a color matching, complimenting or contrasting with that of the sign 32. The dots 34 are luminous such that light impinging thereon is reflected and transmitted throughout the panel 26 ensuring an even light distribution.

9 Claims, 2 Drawing Sheets

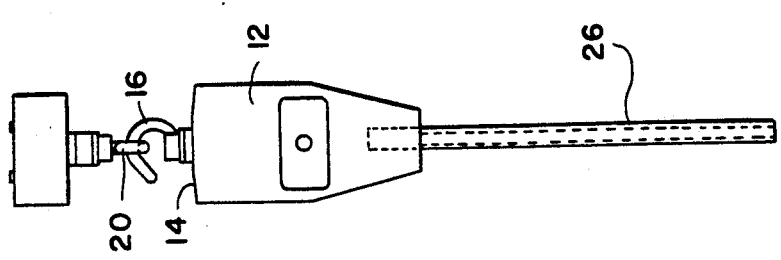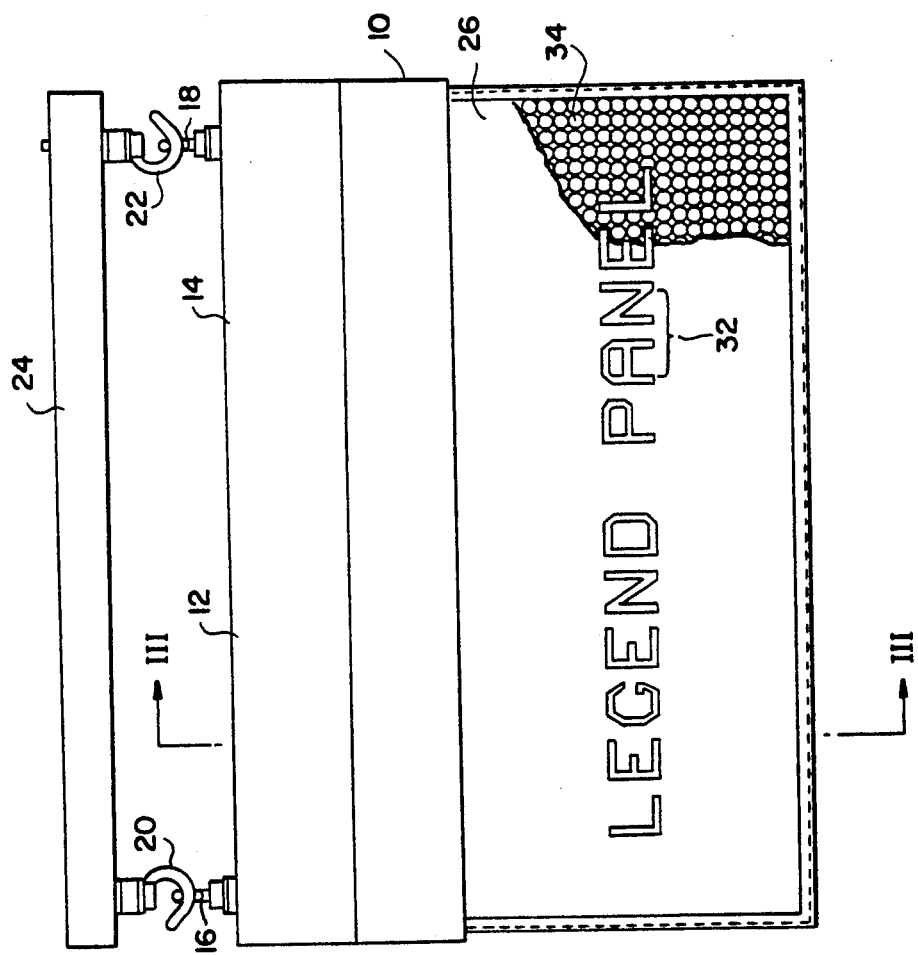

EDGELIT LUMINAIRES

This invention relates to edgelit luminaires and in particular to improvements in the display panel thereof.

An edgelit luminaire (hereinafter referred to as being of the type described) typically comprises an oblong housing containing a source of illumination, usually one or more lamps, and a display panel, of transparent or semi-transparent material, extending (typically depending vertically) from the housing through an opening therein and having on at least one surface a sign, notice or graphic symbol. In operation of the luminaire, the illumination source shines light on that edge of the portion of the display panel which is secured in the opening of the housing and the light is distributed, i.e. internally reflected, throughout the display panel so as to illuminate the sign, notice or graphic symbol which is carried by the panel.

A disadvantage of existing luminaires is that the light from the light source is not extensively or evenly distributed throughout the display panel. In practice the light is concentrated in that portion of the panel closest to the housing with little or no illumination of the outer portions of the panel which as a result appear dark.

An object of the present invention is to improve the light distribution capability of display panels for edgelit luminaires.

With this object in view a first aspect of the invention provides an edgelit luminaire comprising a housing containing a source of illumination arranged substantially adjacent to a display panel attached by one edge to the housing such that the panel extends from an opening in the housing, the display panel having an array of dots on a least part of one surface which dots have a luminosity selected to be affected by illumination provided by the source located in the housing.

The display panel may consist of two sheets of transparent material each of substantially identical dimensions at least one of which has an array of dots on a surface and sandwiching between them a sheet or card of opaque coloured material.

The array of dots and the sign, notice or graphic symbol may be on one and the same side of one or both sheets. Alternatively, they may be on opposite sides of one or both sheets.

However, the coloured sheet is only optional and the two sheets can be placed together without any intervening material. This arrangement will again further enhance light distribution throughout the display panel.

The present invention also provides a display panel, for an edgelit luminaire of the type described, having an array of dots on the entire or greater part of the surface of at least one side, the luminosity of the dots capable of being affected by the luminaire's light source.

Advantageously, the dots are applied to the display panel by a screen-printing process.

The dots preferably have a certain luminous quality being preferably either of flourescent material or phosphorescent material. In that case it has been found that the luminous quality of the dots ensures an even distribution of light from the illumination source throughout the panel giving greatly enhanced illumination of the sign, notice or graphic symbol on the panel.

It should be noted that the array of dots and the sign, notice or graphic symbol can be either on opposite sides of the display panel or, preferably, together on one side only.

By arranging the array of dots differently on each sheet interference fringes are created when the sheets are brought together forming areas of different luminosity on the display panel. This feature is useful for highlighting and emphasing certain parts of the sign, notice or graphic symbol on the panel in preference to other parts.

The invention will be described further, by way of example, with reference to the accompanying drawings, in which:

FIG. 1 is a front view of a first embodiment of the invention;

FIG. 2 is a side view of a first embodiment of the invention;

Figure 5:
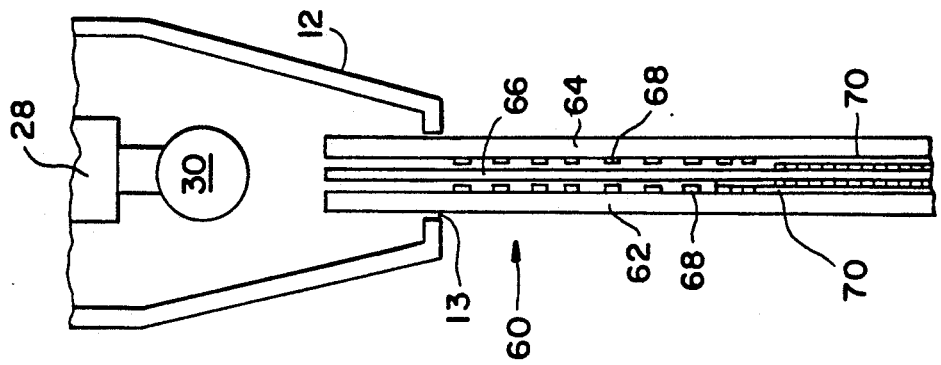
FIG. 5 is a view similar to FIG. 3 of a third embodiment of the invention.

A typical edgelit luminaire referred to generally by the reference numeral 10 comprises an oblong box-like housing 12 of, for example, plastics coated metal or rigid plastics or a combination thereof, although other suitable materials may be chosen. An upper edge 14 of the housing 12 is provided with two metal hooks 16, 18 upstanding therefrom. These hooks 16, 18 engage at right angles with further hooks 20, 22 attached to a mounting box 24 adapted for securement to a ceiling or similar structure.

The housing 12 has an opening 13 (see FIG. 3) in which a display panel 26 is secured and from which it depends vertically. The panel 26 preferably includes a transparent or semi-transparent plastics sheet 27 such as PERSPEX (registered trade mark).

Figure 3:
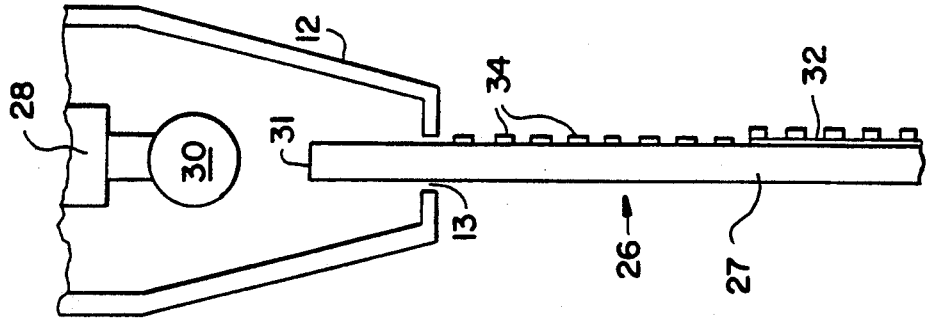
FIG. 3 is a section along the line III—III of FIG. 1 to an enlarged scale.

The interior of the housing, as partially shown in FIG. 3, contains appropriate standard electric/electronic circuity 28 and a source of illumination 30 for the display panel 26. This illumination source is normally in the form of one or more electric lamps or tubes. These lamps 30 are situated so as to illuminate an upper edge 31 of that portion of the panel 26 which is secured within the opening of the housing 12. Light from the lamps 30 shines on the edge of the panel and is distributed through the rest of the panel by internal reflection.

One side of the transparent sheet 27 bears a sign, notice or graphic symbol, for example the wording EMERGENCY EXIT. This is provided as a layer 32 which has sections of different capacity or transparency. The layer 32 is overprinted with an array of dots 34 to form a half-tone, the dots 34 being of uniform size and uniformly spaced.

The dots 34 are applied to a surface of the panel 26 by a screen printing process such that approximately 50% of each square inch (approx. 6.45 cm$^2$) of the surface area is covered with dots with a count, taken diagonally across the square, of 36 dots.

The dots 34 are advantageously of a point of a colour to match, complement or contrast with the colour of the chosen sign, notice or graphic symbol depending on the end use requirements.

The paint selected to form the dots 34 preferably has a luminous quality i.e. is flourescent or phosphorescent.

In operation of the luminaire 10, the luminous quality of the dots 34 ensures an even distribution of light from the source 30 throughout the entire panel 26 thus enhancing the luminosity of the sign, notice or graphic symbol 32 which the panel 26 carries.

Figure 4:
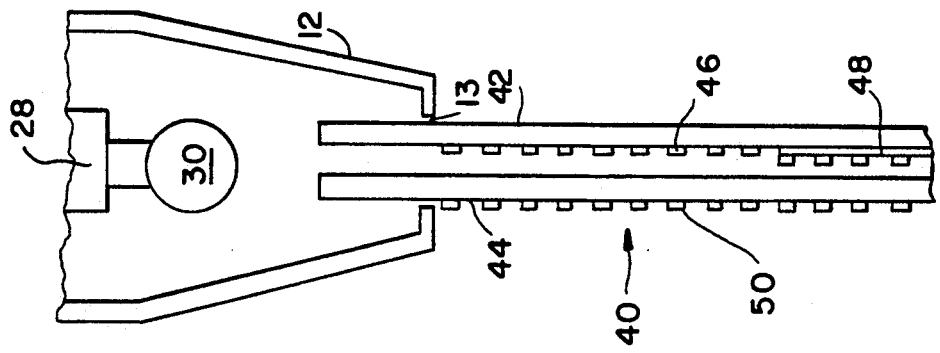
FIG. 4 is a view similar to FIG. 3 of a second embodiment of the invention.

In an alternative embodiment of the luminaire shown in FIG. 4, the display panel 40 consists of two substantially identical transparent or semi-transparent plastic sheets 42, 44. One of the two sheets 42 carries both the array of dots 46 and the sign, notice or graphic symbol 48 on one side thereof, and the second sheet 44 has an array of dots 50 only on one side. The dots 50 on the second sheet 44 are arranged to abut against the first sheet 42 and that side which carries both the array of dots 46 and the sign, notice or graphic symbol 48.

In a further alternative embodiment of the luminaire shown in FIG. 5, the display panel 60 again consists of two substantially identical sheets 62, 64 with a piece of card or similar opaque material 66, sandwiched between the two sheets. The card 66 is selected to be of a colour identical with, complementary to or contrasting with the colour of the dots 68 and/or sign, notice or graphic symbol 70 carried by the panel 60. This arrangement is useful for double-sided display panels 60 where one side of each sheet 62, 64 has both the array of dots and the sign, notice or graphic symbol and in each case that side abuts the intervening card.

The invention is not confined to the precise details of the foregoing which may be varied within the scope of the invention. Thus, for example, the array of dots may be printed on both sides of the or each sheet forming the panel. The display panel may extend vertically, laterally or at any chosen angle from the housing of the luminaire instead of depending vertically.

I claim:

1. An edgelit luminaire comprising: a housing having an opening, a display panel having an upper edge and at least one surface carrying a layer having sections of differing transparency forming a graphic symbol, a source of illumination arranged in the housing and located substantially adjacent to the upper edge of said display panel, said display panel attached to the housing such that the panel extends from the opening in the housing and an array of dots on substantially the entire said one surface including said layer of differing transparency, said array of dots having a luminous quality affected by said source of illumination to spread light throughout the entire surface of said display panel thereby greatly enhancing illumination of said graphic symbol.

2. An edgelit luminaire comprising: a housing having an opening, a display panel having an upper edge, a source of illumination arranged in the housing and located substantially adjacent to the upper edge of said display panel, wherein said display panel is attached to the housing such that the panel extends from the opening in the housing, said display panel having at least one surface carrying a graphic symbol and on substantially all said one surface, an array of dots having a luminous quality affected by said source of illumination to spread light throughout the entire surface of said panel the display panel includes a second surface, each surface consisting of a sheet of transparent material of substantially identical dimensions, one sheet having said array of dots on a surface and a further sheet of opaque coloured material sandwiched between the sheets.

3. An edgelit luminaire comprising: a housing having an opening, a display panel having an upper edge, a source of illumination arranged in the housing and located substantially adjacent to the upper edge of said display panel, wherein said display panel is attached to the housing such that the panel extends from the opening in the housing, said display panel having at least one surface carrying a graphic symbol and on substantially all said one surface, an array of dots having a luminous quality affected by said source of illumination to spread light throughout the entire surface of said panel wherein the display panel includes a second surface, each said surface provided by respective sheets of transparent material of substantially identical dimensions, one sheet having said array of dots on a surface and an opaque coloured card sandwiched between the two sheets.

4. In an edgelit luminaire, a display panel having one edge and at least one surface carrying a layer having sections of differing transparency forming a graphic symbol, an array of luminous dots of uniform spacing and uniform size on substantially the entire of said one surface, including said layer of differing transparency, said one edge being illuminated by a source of light, and said luminous dots affected by said source of light, ensuring an even distribution of light throughout the surface of the display panel resulting in greatly enhanced illumination of the graphic symbol.

5. In the edgelit luminaire as in claim 4 in which the dots are applied by a screen printing process.

6. In the edgelit luminaire as in claim 4 in which the array of dots is applied on top of the graphic symbol on only one side of the panel.

7. In the edgelit luminaire as in claim 4 further including a second surface, said dots being applied to each of the surfaces on a same side thereof.

8. In the edgelit luminaire as in claim 4 further including a second surface, said dots being applied to each of the surfaces on sides thereof which are adjacent.

9. An edgelit luminaire comprising: a housing having an opening, a display panel having an upper edge, a source of illumination arranged adjacent to the upper edge of said display panel, and a graphic symbol, said display panel attached to the housing such that the panel extends from the opening therein, the display panel consists of two sheets of transparent material of substantially identical dimensions, each of said sheets carries an array of luminous dots on one surface and at least one of said sheets carries said graphic symbol, said array of luminous dots being on substantially the entire panel surface including the graphic symbol for ensuring an even distribution of light throughout the entire surface of the panel.

* * * * *